(No Model.)
M. M. CAMP.
PIPE COUPLING.
No. 283,072.  Patented Aug. 14, 1883.
Fig. 1.
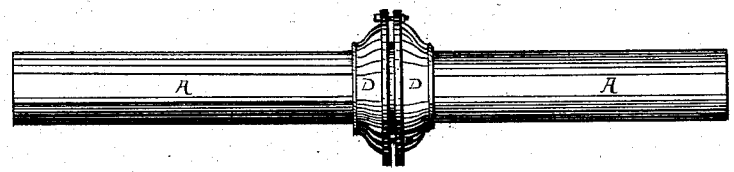
Fig. 6.
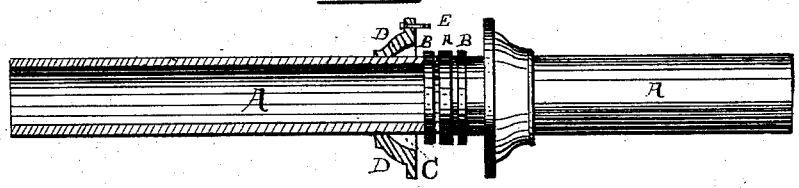
Fig. 5.
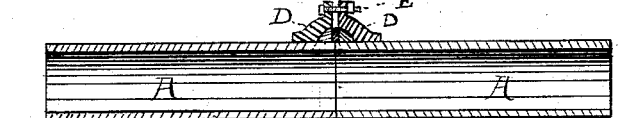
Fig. 7.
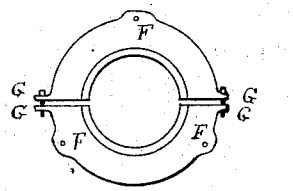
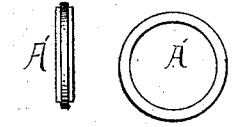
Fig. 4.
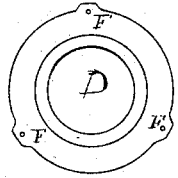
Fig. 3.
Fig. 2.
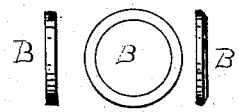
Fig. 8.
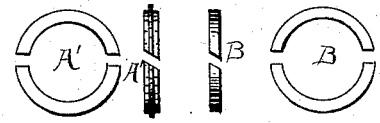
Witnesses  
C. W. Brown.  
W. C. Gates.
Inventor  
Mortimer M. Camp  
Per Warwick and Barlett  
His attorneys.

UNITED STATES PATENT OFFICE.

MORTIMER M. CAMP, OF NEW HAVEN, CONNECTICUT, ASSIGNOR TO THE INDESTRUCTIBLE WATER PIPE COMPANY, OF NEW YORK.

PIPE-COUPLING.

SPECIFICATION forming part of Letters Patent No. 283,072, dated August 14, 1883.

Application filed February 24, 1883. (No model.)

*To all whom it may concern:*

Be it known that I, MORTIMER M. CAMP, of the city and county of New Haven, in the State of Connecticut, have invented certain new and useful Improvements in Pipe-Couplings, of which the following is a detailed description, reference being had to the accompanying drawings, whereon like letters of reference indicate like parts.

This invention consists in an improved pipe coupling or joint, as will be hereinafter described.

The object of the invention is to furnish a coupling or joint by which pipes may be united without flanges or threads at the ends, and whereby a durable and tight joint may be made.

The details of my invention are hereinafter pointed out in the claims.

In the drawings, which form a part of this specification, Figure 1 is a side elevation of two pipes coupled together as in my invention. Fig. 2 is a view of the gaskets, (face and side,) and also a side view of one of the gaskets when it has been applied to the coupling and compressed. Fig. 3 gives a front and side view of sleeve, ring, or collar. Fig. 4 is a face view of the flanged stuffing-box. Fig. 5 is a longitudinal section of two pipes with coupling applied. Fig. 6 shows one part of the pipe in elevation with the coupling nearly in position, and the other part of the pipe and coupling in section. Fig. 7 is a face view of flanged stuffing-box made in two parts. Fig. 8 shows the gaskets and sleeves made in two parts.

The coupling may be used to join two pipes, or may be passed on a pipe already in position, for the purpose of stopping a leak.

A A represent the pipes to be coupled, or a pipe in which a leak is to be repaired.

B B represent soft-metal packing rings or gaskets, the internal diameter of which rings is such as to pass readily over the pipes to be coupled.

A' A' are hard-metal rings of approximately the same diameter as the gaskets B.

D D are stuffing boxes or collars of such size as to surround the pipe, and having flanges or projections, through which bolt-holes F F pass.

The stuffing-boxes have recesses C, of tapering form, as shown.

The parts enumerated above constitute my pipe-coupling in simple form, and are applied as shown in the drawings, and as will be now described.

A stuffing-box, D, is slipped over the end of each section of pipe to be coupled, the recesses C being on that side of the stuffing-box toward the joint. A soft-metal gasket, B, is passed onto the ends of pipe sections next the recesses in the stuffing-boxes. The hard-metal sleeve or collar A' is then passed about half its width onto one of the pipes, and the other pipe is passed into the sleeve. Now, by drawing together the stuffing-boxes D by means of screw-bolts E, which pass through holes F in line with each other, the soft-metal gaskets B are compressed between the stuffing-boxes and the hard-metal ring, and are forced to expand into the recesses C, and, being by the form of these recesses compressed upon the pipe, will serve to draw and retain the pipe-sections together. At the same time the soft-metal gaskets B flow round the collar A' and form a tight joint, so that there will be no leakage.

In repairing a leak, or when for any reason it is inconvenient to pass the rings and boxes over the ends of the pipe-sections, it is convenient to use stuffing-boxes, rings, and gaskets divided or made in sections, as shown in Figs. 7 and 8. The stuffing-boxes are made in two sections or halves, having flanges G extending radially. These sections can be drawn together by bolts after being put on the pipe. The gaskets and rings are divided in the same way, but preferably on diagonal lines, as shown in Fig. 8. When these broken collars and gaskets are applied to the pipe, and the boxes are drawn together by bolts E, as before, the flow or expansion of the soft-metal gaskets B will close all apertures and make tight joints.

The hard-metal ring A' may be made with square edges, or with rabbets on the sides, which bear against the gaskets. The soft-metal rings are of such width in radial direction as to about fill the wider part of recess C in the stuffing-box. Should the pressure be sufficient when the parts are united, the gaskets B will assume the form of the space between the wall of recess C and the pipe A.

I am aware that divided collars and soft-metal gaskets and uniting-bolts have heretofore been used in pipe-couplings. I claim none of these features separately.

What I claim is—

1. The combination, with pipe-sections having flush unbroken outer surfaces, of stuffing-boxes having inclined recesses, as shown, soft-metal gaskets adapted to be compressed into said recesses, a hard-metal ring interposed between the gaskets, and mechanism, substantially as described, for drawing the stuffing-boxes toward each other, as set forth.

2. The combination, with pipes having flush unbroken outer surfaces, of packing-boxes having inclined recesses, as shown, two soft-metal gaskets, and a hard-metal ring interposed between said stuffing-boxes in the manner stated, and screw-bolts passing through flanges on the stuffing-boxes and adapted to draw said boxes toward each other, all substantially as stated.

3. The combination, with pipe-sections having smooth outer surfaces, of stuffing-boxes having inclined recesses, as described, each stuffing-box being in two parts and capable of being united, as described, and soft-metal gaskets and hard-metal ring, divided as described, when all the parts are arranged to be united by clamping mechanism, as described, as and for the purposes stated.

In testimony that I claim the foregoing as my own I have hereunto set my hand this 21st day of February, A. D. 1883.

MORTIMER M. CAMP.

Witnesses:
BENJAMIN J. SLINGS,
LEWIS L. HURLBUTT.